United States Patent [19]
Furuhashi

[11] Patent Number: 5,815,632
[45] Date of Patent: Sep. 29, 1998

[54] APPARATUS FOR VIDEO SIGNAL PROCESSING

[75] Inventor: Makoto Furuhashi, Kangawa, Japan

[73] Assignee: Sony Corporation, Tokyo, Japan

[21] Appl. No.: 928,011

[22] Filed: Sep. 11, 1997

Related U.S. Application Data

[63] Continuation of Ser. No. 598,161, Feb. 7, 1996, abandoned, which is a continuation of Ser. No. 154,626, Nov. 18, 1993, abandoned.

[30] Foreign Application Priority Data

Nov. 19, 1992 [JP] Japan .................................. 4-310272

[51] Int. Cl.[6] ................................................. H04N 5/76
[52] U.S. Cl. .............................. 386/46; 386/112; 386/91; 386/126
[58] Field of Search .................................. 358/335, 342, 358/341, 343; 348/715, 716; 395/119, 120, 129; 386/46, 109, 112, 125, 124, 81, 91, 126, 105; H04N 5/76

[56] References Cited

U.S. PATENT DOCUMENTS

| 4,437,125 | 3/1984 | Yamamoto | 358/327 |
|---|---|---|---|
| 4,703,369 | 10/1987 | Moriyama et al. | 358/343 |
| 4,716,460 | 12/1987 | Benson et al. . | |
| 4,775,859 | 10/1988 | Starkey, IV et al. . | |
| 4,831,557 | 5/1989 | Murata | 395/129 |
| 5,208,679 | 5/1993 | Yamauchi et al. | 358/343 |

FOREIGN PATENT DOCUMENTS

| 61-180378 | 8/1986 | Japan . |
|---|---|---|
| 2244896 | 4/1991 | United Kingdom . |

*Primary Examiner*—Thia Tran
*Assistant Examiner*—Huy Nguyen
*Attorney, Agent, or Firm*—Jay H. Maioli

[57] ABSTRACT

An apparatus for video signal processing satisfactorily synthesizes images by using field memories and includes control circuit for controlling an operation for making an image, first and second field memories in which image data is written under the control of the control circuit, and output circuit for outputting image data alternately read out from the first and second field memories at a field period as a video signal to be displayed in an interlace fashion, wherein a vertical direction coordinate of coordinate data written in the second memory is shifted from a vertical coordinate written in the first field memory by half of a horizontal line.

13 Claims, 4 Drawing Sheets

APPARATUS FOR VIDEO SIGNAL PROCESSING

This is a continuation of application Ser. No. 08/598,161 filed Feb. 7, 1996, abandoned, which is a continuation of application Ser. No. 08/154,626 filed Nov. 18, 1993, now abandoned.

BACKGROUND OF THE INVENTION

1. Field of the Invention

The present invention relates to an apparatus for video signal processing that processes a video signal in order to display image data recorded on a recording medium such as a CD-ROM (compact disk read-only memory) or the like as a moving picture on a CRT (cathode ray tube) display or the like.

2. Description of the Related Art

CD-ROMs for recording digital data on an optical disk in the form of pits have a large recording capacity and are now utilized as external recording media of game machines using microcomputers and personal computers. Also, it has been proposed that image data of a moving picture (i.e., animation) is recorded on a CD-ROM, the image data thus recorded being read out from the CD-ROM and supplied to a host computer so that a moving picture is displayed on a display device such as a CRT or the like.

In this case, a moving picture that is displayed on the display device of the game machine must be changed in display mode in accordance with the progress of the game. More specifically, unlike the case that a video program such as a movie or the like is reproduced from a VTR (video tape recorder) and so on, an image that will be displayed next is changed with the playing situation of the game. Therefore, in order to make a smooth progression in the image of the game, the computer side must effect the processing for successively changing a display image (i.e., making a display picture successively) in correspondence with the playing situation of the game.

In the arrangement of the actual game machine using the CD-ROM, image data read out from the CD-ROM and a program for making a display image from the image data are transferred to a buffer memory in a host computer side of the game machine body. Then, the image data stored in the buffer memory is processed in a necessary predetermined processing fashion in accordance with the program, for being converted into display image data thereby. This display image data is output as a video signal of a predetermined format (i.e., NTSC system or the like).

When the synthesizing process of such a display image is carried out, data to be displayed is written in an image memory by using image memory such as a frame memory or the like. Then, at the present moment while data of one picture is written in the image memory, image data of another picture is read out and processed so as to become a video signal. Accordingly, to display a smooth moving picture, there must be provided at least two image memories. While the image is synthesized by the writing of data in one image memory, the image whose synthesizing process is ended is read out from the other image memory. In this case, the memory for synthesizing the image and the memory for reading out the image must be switched at one field or frame period.

Although it is customary that two image memories are needed for displaying the moving picture, frame memories that can store therein all horizontal lines constituting one picture are utilized as the respective image memories in order to display an image of high resolution. Then, an image is formed by alternately using the two frame memories at one field period, and the frame memory from which image data is read out is switched, thereby displaying a moving picture which changes at every field. In this case, the number of horizontal lines constituting an image read out at each field (i.e., video signal output at each field period) is half of the number of all horizontal lines constituting one image, and an interlace processing for changing the horizontal lines at one field period is carried out. Therefore, of the image data thus made at one field period, data that is used to make an image in actual practice (i.e., image data output as the video signal) is image data corresponding to the half of all the horizontal lines.

When the two frame memories are used as described above, image data having accurate pixel positions is obtained at every field and hence an image of high resolution can be displayed.

The frame memory used as the image memory is expensive. Accordingly, if two expensive frame memories are used for the image processing, there is then the disadvantage that a manufacturing cost of the apparatus for video signal processing for game machines is increased.

To solve this disadvantage, the frame memory, for example, may be replaced with a field memory that can store therein image data of one field (i.e., data corresponding to half of all horizontal lines). In an image that was synthesized by using field memory, the minimum unit with which a moving object is moved in the vertical direction of the picture becomes a 2-line unit. There is then the disadvantage that the object displayed on the picture thus formed is moved with a deteriorated accuracy. More specifically, if the image synthesizing processing is carried out by using the frame memory at every field, the image synthesizing processing using all horizontal lines is carried out so that the position of the object in the displayed picture becomes accurate. If on the other hand the image synthesizing processing is carried out by using the field memory at every field, then the image synthesizing processing is carried out by using the half of all horizontal lines. There is then the risk that the position of the object in the displayed picture becomes inaccurate.

This defect becomes conspicuous particularly when an image of an object whose action is quick and complex, such as a picture displayed on the display screen of the game machine, is synthesized.

OBJECTS AND SUMMARY OF THE INVENTION

Therefore, it is an object of the present invention to provide an improved apparatus for video signal processing in which the aforesaid shortcomings and disadvantages encountered with the prior art can be eliminated.

More specifically, it is an object of the present invention to provide an apparatus for video signal processing in which an excellent image synthesizing processing can be carried out by using a field memory at every field.

It is another object of the present invention to provide an apparatus for video signal processing in which an image of double density can be inexpensively displayed in an interlace display fashion.

According to a first aspect of the present invention, there is provided an apparatus for video signal processing for making an image from image data formed of at least modelling data. This apparatus is comprised of a control circuit for controlling an operation for making an image, a field memory of a first field for storing a vertical direction coordinate as a position on a scanning line when a vertical direction coordinate of modelling data in a first field is located on a scanning line of a second field, a field memory of a second field for storing a vertical direction coordinate as a position on a scanning line when a vertical direction coordinate of modelling data in a second field is located on a scanning line of a first field, an image synthesizing circuit for alternately reading out image data from said pair of field memories at a field period so as to synthesize an image to be displayed in an interlace fashion, and an output circuit for outputting image data output from the image synthesizing circuit in the form of image data.

Further, modelling data contained in image data is comprised of polygon data.

According to the present invention, although the image memory that effects an image synthesis of one field is the field memory, the image processing at the accurate pixel position at each field can be carried out.

Further, according to the present invention, although an image processing equivalent to the image processing executed when a frame memory is used as an image memory can be carried out, a required capacity of a memory can be reduced considerably.

Furthermore, according to the present invention, since the image data is formed of polygon data, an image processing in which a three-dimensional object is projected onto a two-dimensional plane can be carried out satisfactorily by using a field memory.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

An apparatus for video signal processing according to an embodiment of the present invention will now be described with reference to the drawings.

Figure 1:
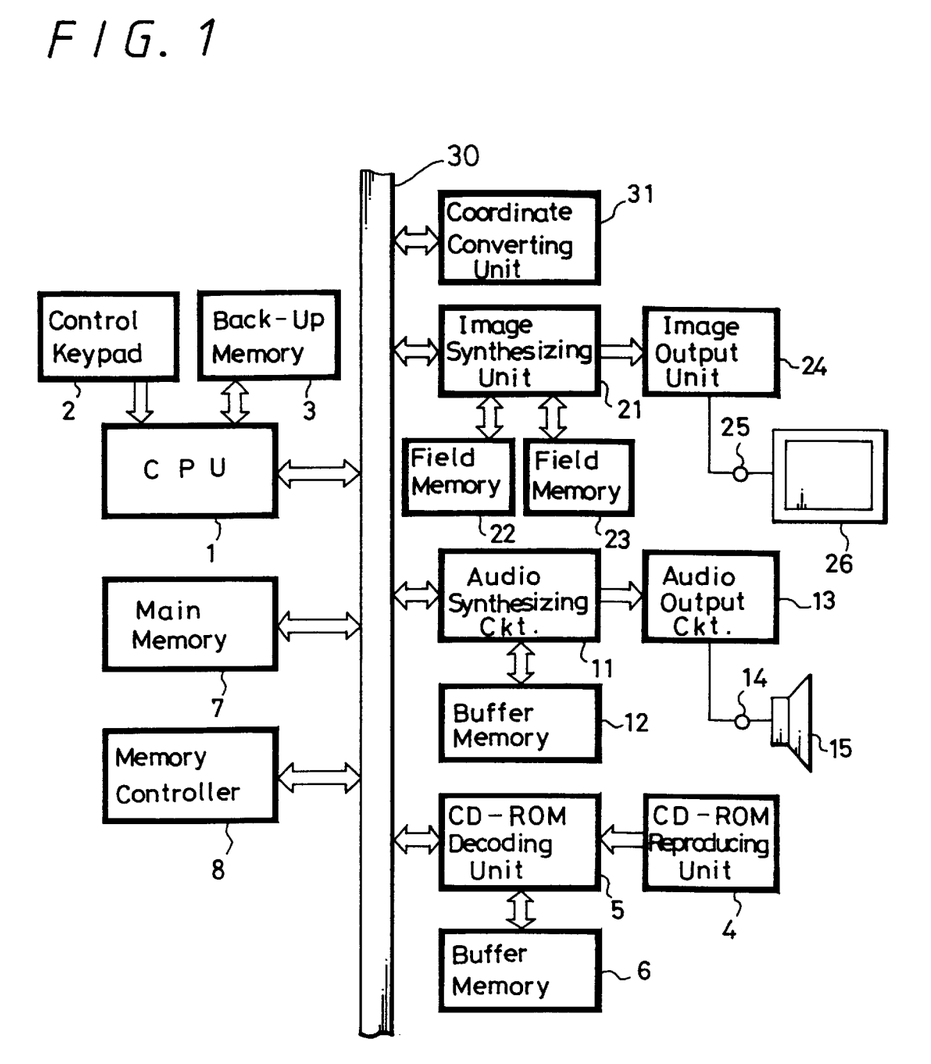
FIG. 1 is a schematic block diagram showing a circuit arrangement of an apparatus for video signal processing according to an embodiment of the present invention.

In this embodiment, the apparatus for video signal processing according to the present invention is adapted to read out image data stored in a CD-ROM in accordance with the execution of a game and then displays a moving picture, such as an animation or the like. FIG. 1 of the accompanying drawings shows a circuit arrangement of the apparatus according to the present invention.

As shown in FIG. 1, there is provided a central control apparatus (hereinafter simply referred to as a CPU) 1 that is formed of a microcomputer. The CPU 1 is connected to a control keypad 2. A game progresses in accordance with operations of keys (not shown) or the like disposed on the control keypad 2, and control operations of respective units of this apparatus are effected by operating these keys. In this case, a back-up memory 3 is connected to the CPU 1.

There is shown a CD-ROM reproducing unit 4, and data such as a game program or the like is played back from an optical disk (CD-ROM) that is loaded on the CD-ROM reproducing 4. Data played back by the CD-ROM reproducing unit 4 is supplied to a CD-ROM decoding unit 5 and data is decoded thereby. A buffer memory 6 is connected to the CD-ROM decoding unit 5. Image data is stored in the buffer memory 6 at every odd-numbered field and even-numbered field and reproduced in synchronism with the field period.

Data decoded by the CD-ROM decoding unit 5 is transferred through a bus line 30 to a main memory 7, in which it is processed in a predetermined processing fashion under the control of the CPU 1. A memory controller 8 is connected to the bus line 30, and data is written in and read out from the main memory 7 under the control of the memory controller 8 in accordance with an instruction from the CPU 1.

There is provided an audio synthesizing circuit 11 to which there are supplied audio data and a program needed for decoding the audio data through the bus line 30 from the main memory 7. The audio synthesizing circuit 11 effects the audio processing on the basis of the program needed for decoding the audio data so that the audio data is decoded to a digital audio signal. The digital audio signal thus obtained is supplied to an audio output circuit 13, in which it is converted into an analog audio signal and a sound is emanated from a speaker 15 connected to an output terminal 14 of the audio output circuit 13. The audio synthesizing circuit 11 is connected to a buffer memory 12 and the audio processing operation is executed by using the buffer memory 12.

There is provided an image synthesizing unit 21 to which there are supplied image data and a program needed for decoding the image data through the bus line 30 from the main memory 7 and the CD-ROM decoding unit 5. Therefore, the image synthesizing unit 21 synthesizes the image data supplied thereto to an image of one field on the basis of the program needed for decoding the image data. Two field memories 22 and 23 are connected to the image synthesizing unit 21, and a synthesizing processing operation of an image of one field is effected by alternately utilizing the two field memories 22, 23 at one field period. More specifically, during a certain field period, image data is written in one field memory 22 in accordance with a program and the image synthesizing processing operation is executed, whereas image data written in the other field memory 23 is read out and then output. In the next field period, image data written in one field memory 22 is read out and then output. Simultaneously, image data is written in the other field memory 23 in accordance with the program and the image synthesizing processing operation is executed. Therefore, the image synthesizing processing operation of one picture (i.e., one field) by the image synthesizing unit 21 using the two field memories 22 and 23 is generally ended during one field period. The image synthesizing unit 21 carries out this image synthesizing processing operation on the basis of the program stored in the main memory 7 under the control of the CPU 1. Image data or the like is transferred from the main memory 7 to the image synthesizing unit 21 under the control of the memory controller 8.

The image synthesizing processing is alternately carried out at one field period by using the two field memories 22, 23, and image data read out from the two field memories 22, 23 are supplied from the image synthesizing unit 21 to an image output unit 24. Then, this image data is output from an output terminal 25 as a video signal having a predetermined format such as the NTSC system or the like, and a synthesized image is displayed on a picture screen of a monitor receiver 26 connected to the output terminal 25.

The field memories 22, 23 connected to the image synthesizing unit 21 according to the embodiment of the present invention can process coordinate data provided between the horizontal lines as vertical direction coordinate data. More specifically, data in which one bit is added to the least significant bit is written in the field memories 22, 23 as vertical direction coordinate data, and a ½ line shift position can be instructed by this added one bit from the position at which the horizontal line exists. The field memories 22, 23 are each constructed as an ordinary field memory (i.e., memory having a capacity capable of storing therein only image data forming one field), excepting the point that one bit is added to represent the vertical direction coordinate data.

There is shown a coordinate converting unit 31 which effects the conversion processing of geometry data or the like contained in the image data transferred to the main memory 7 or the like. In this embodiment, when images of an object expressed in a three-dimensional space are synthesized (subjected to a processing operation for forming an image of a three-dimensional object on a two-dimensional plane), data of the object expressed in the three-dimensional space is formed of modelling data that is data representative of at least a shape of an object (data of a coordinate position of an apex of an object in actual practice) and geometry data that is data representing a coordinate position (coordinate system) at which the object is expressed. Therefore, if the geometry data is changed, then the object that is represented by the modelling data is moved accordingly.

The modelling data representing the shape of the object is comprised of polygon data, texture data or the like. To be more concrete, the modelling data representing the shape of the object is data that is expressed as a polygon three-dimensional object. Data of respective planes (triangle) that construct the polygon three-dimensional object are a set of polygon data. Therefore, the polygon data and the modelling data form a hierarchical structure so that modelling data can be obtained by searching polygon data. Then, the object is satisfactorily displayed as an image by carrying out a processing for a pattern represented by texture data. This processing is what might be called texture mapping.

The modelling data and geometry data thus arranged are recorded on a CD-ROM (not shown). The modelling data and geometry data recorded on the CD-ROM are reproduced by the CD-ROM playback unit 4 and modelling data and geometry data decoded by the CD-ROM decoding unit 5 are supplied to and stored in the main memory 7 through the bus line 30.

When a processing for changing the coordinate position of the object represented by the modelling data becomes necessary in accordance with the progress of the game, the geometry data stored in the main memory 7 is converted by the coordinate converting unit 31. This conversion processing is carried out under the control of the CPU 1.

Description will next be made of a processing executed when an image of an object expressed in the three-dimensional space is synthesized. In this embodiment, the modelling data and the geometry data are recorded on the CD-ROM so that, when this image synthesizing processing is carried out, modelling data and geometry data are reproduced from the CD-ROM and then transferred to the main memory 7. In this case, inasmuch as an object that will be displayed is not changed, the data transferred once to the main memory 7 is repeatedly used as the modelling data to synthesize the image, and data needed in response to the mode of the image to be displayed is successively reproduced from the CD-ROM and transferred to the main memory 7 for the geometry data. Incidentally, the above-mentioned successive data read-out operation is herein referred to as a streaming.

Geometry data is successively read out in a streaming fashion continuously at every field period because the image is synthesized at every field period. Accordingly, as geometry data stored in the main memory 7, only data needed in each case is sequentially updated and then stored in the main memory 7. A processing for selecting and sequentially reading out necessary geometry data from the geometry data recorded on the CD-ROM is controlled by the CPU 1 while the CPU 1 judges the progress of the game.

The modelling data and the geometry data stored in the main memory 7 are processed by the coordinate converting unit 31 in a coordinate conversion processing fashion, when necessary, and then supplied to the image synthesizing unit 21, in which they are written in an area corresponding to the display portion of the image synthesizing field memory 22 or 23, thereby obtaining synthesized image data to be displayed. Then, the image data written in the field memory 22 or 23 is read out and a video signal is obtained from the image output unit 24.

Figure 2:
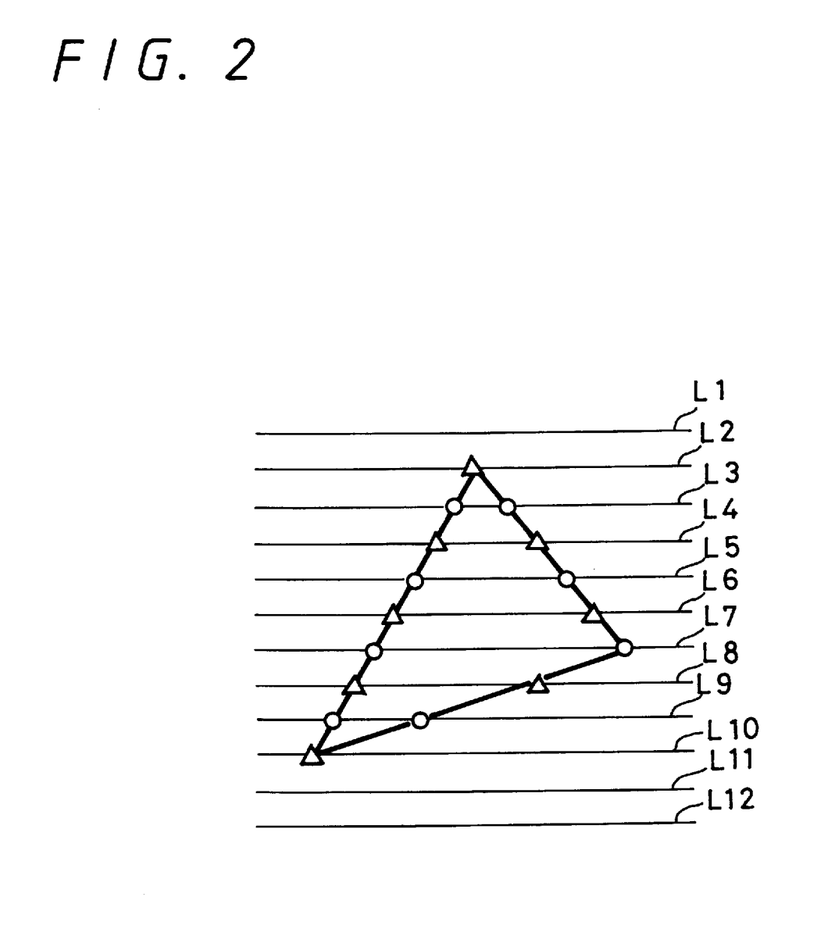
FIG. 2 is a diagram of an image of one frame arranged by polygon data.

The image synthesizing processing using the field memories 22, 23 connected to the image synthesizing unit 21 will be described. Data (polygon data) representing the shape of the modelling data is formed of a set of polygon data and polygon data is written in the field memories 22, 23 at coordinate positions indicated by the geometry data. When a triangle represented by some polygon data is displayed as an image of one frame as shown in FIG. 2, an image of one frame is composed of two fields so that pixel data (pixels shown by open circles in FIG. 2) on odd-numbered horizontal lines L1, L3, L5, . . ., are formed by images of odd fields and pixel data (pixels shown by open triangles in FIG. 2) on even-numbered horizontal lines L2, L4, L6, . . ., are formed by images of even-numbered fields. The images of odd-numbered fields and the images of the even-numbered fields are processed by different field memories. When images of odd-numbered fields, for example, are synthesized by one field memory 22, images of even-numbered fields are synthesized by the other field memory 23.

Figure 3A:
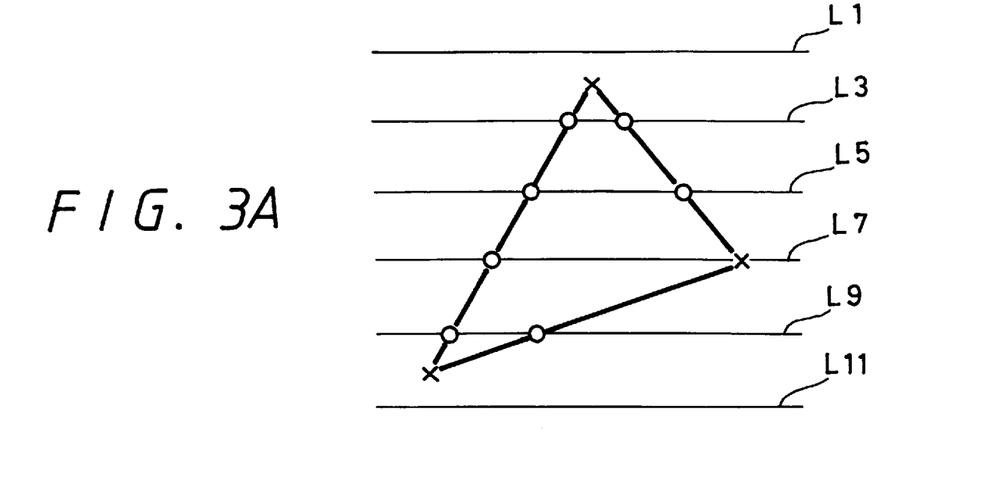
FIGS. 3A and 3B are diagrams used to explain examples of images that are processed during respective field periods.
Figure 3B:
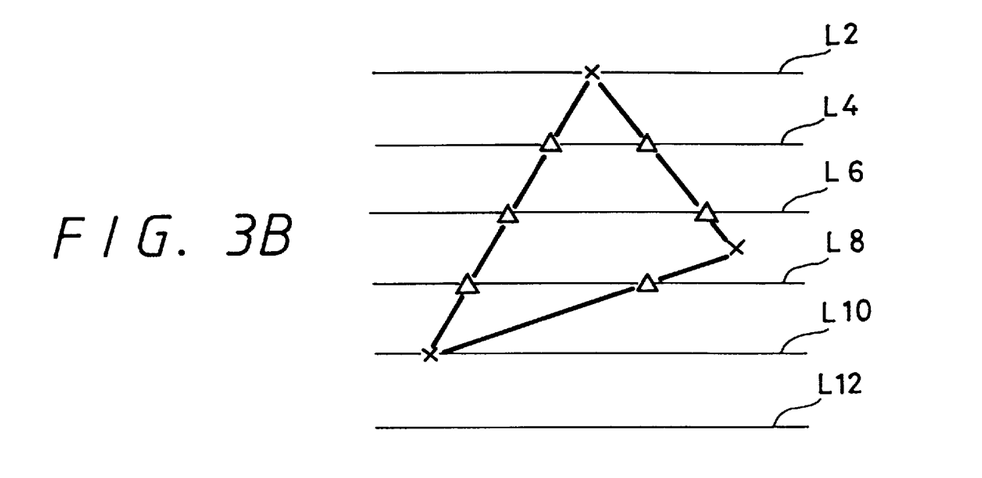

FIGS. 3A and 3B, respectively, show the image of an odd-numbered field and the image of an even-numbered field in an analyzed fashion. When these images are written in the respective field memories 22 and 23, data representing the coordinate position of an apex (positions shown by crosses in FIGS. 3A, 3B) of the triangle is obtained by the polygon data. Positions at which respective sides connecting apexes of triangle cross horizontal lines are obtained by calculation. The calculated positions (including the apex when the apex is located on the horizontal line) are written in the field memory as pixel positions.

In this embodiment, the vertical coordinate of the apex of the triangle shown by the polygon data is written in the respective field memories 22, 23 as a coordinate of horizontal lines so that the triangle that is formed of one frame as shown in FIG. 2 is analyzed into odd-numbered fields and even-numbered fields at that coordinate position. More specifically, while the upper apex of the triangle, for example, is located on the horizontal line L2 existing on the even-numbered field, it is displayed as a coordinate position between the horizontal lines L1 and L3 in the odd-numbered field shown in FIG. 3A, and then processed at the same pixel position as that of the even-numbered field. That is, the apex of the triangle that should be located on the horizontal line of the even-numbered field shown in FIG. 3B is interpolated as a point on the horizontal line of the odd-numbered field shown in FIG. 3A in the odd-numbered field. Therefore, an accuracy with which the object is located at the vertical direction position on the picture screen can be improved. Also, a motion of a moving picture can be prevented from becoming unnatural.

Therefore, an image that is displayed in an interlace fashion by one frame formed of the odd-numbered field and the even-numbered field becomes an image in which pixel positions of respective fields become proper. Thus, an accurate triangle is displayed in an interlace display fashion, and a three-dimensional object that is comprised of a set of these triangles can be displayed in an interlace display fashion.

Figure 4:
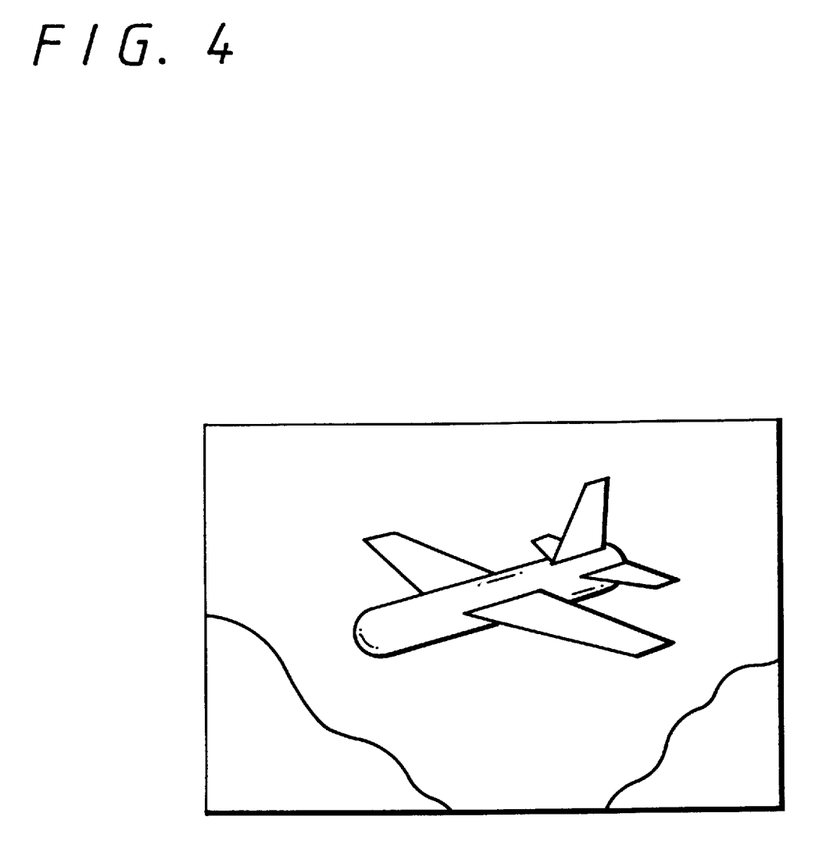
FIG. 4 is a pictorial representation of an example of a picture displayed by the apparatus for video signal processing according to the embodiment of the present invention.

With the above-mentioned image synthesizing processing, as, for example, shown in FIG. 4, a three-dimensional object (airplane) comprised of modelling data is displayed on the picture screen of the monitor receiver 26 in a two-dimensional fashion. In this case, if an image that is displayed on a background is made by different image data and synthesized by the image synthesizing unit 21, then a more complicated image can be displayed.

With the apparatus for video signal processing according to the embodiment of the present invention, while the image memory connected to the image synthesizing unit 21 for synthesizing the image of one field is formed of the field memories 22 and 23, the image synthesizing processing at accurate pixel positions at each field can be carried out and the image synthesizing processing with the same accuracy as that provided when the frame memory is utilized as the respective memories. Therefore, a required capacity of a memory can be reduced considerably as compared with the conventional apparatus using the frame memory.

Further, although the field memory needed in this embodiment must process (store) data having one bit more as coordinate data in the vertical direction as compared with an ordinary field memory, such increase of a capacity of the field memory is negligible as compared with a frame memory having a storage capacity of twice that of the field memory.

Furthermore, while the apparatus for video signal processing according to the present invention is applied to the image display apparatus for the game machine as described above, the present invention is not limited thereto and may be applied to other similar image synthesizing apparatus. In addition, while the CD-ROM is used as the image data recording medium as described above, the present invention is not limited thereto and may be applied to other recording media than the CD-ROM.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An apparatus for video signal processing for making an image from image data that includes at least three-dimensional modelling data, said apparatus comprising:

control means for controlling an image making operation that represents three-dimensional modelling data as two-dimensional polygons having apexes;

a pair of field memories comprised of an odd field memory for storing odd pixel data corresponding to intersections between a polygon and odd-numbered horizontal scanning lines and an even field memory for storing even pixel data corresponding to intersections between said polygon and even-numbered horizontal scanning lines, said odd and even field memories being controlled by said control means to respectively store said odd pixel data and said even pixel data as vertical direction coordinates of said polygon corresponding to positions on said odd-numbered and said even-numbered horizontal scanning lines, wherein said odd field memory includes one odd bit for indicating when an apex of said polygon is located between odd-numbered horizontal scanning lines of a present odd field and on an even-numbered horizontal scanning line of an adjacent even field, and wherein said even field memory includes one even bit for indicating when an apex of said polygon is located between even-numbered horizontal scanning lines of a present even field and on an odd-numbered horizontal scanning of an adjacent odd field;

coordinate converting means controlled by said control means for converting coordinate data including said said vertical direction coordinates corresponding to said one odd bit and said one even bit into image data for said odd and even field memories;

image synthesizing means controlled by said control means for alternately reading said image data from each of said odd and even field memories at a field period to synthesize an image to be displayed in an interlace fashion and for producing display data, said synthesizing means processing said one odd bit included in said odd field memory to produce a half-line vertical shift in an apex of said display data for a corresponding odd field so that a vertical position of said apex located between odd-numbered horizontal scanning lines in said image to be displayed is accurately maintained in every odd field, and said synthesizing means processing said even bit included in said even field memory to produce a half-line vertical shift in an apex of said display data for a corresponding even field so that a vertical position of said apex located between even-numbered horizontal scanning lines in said image to be displayed is accurately maintained in every even field; and output means for outputting said display data from said image synthesizing means as a video signal for display.

2. An apparatus for video signal processing for making an image from image data that contains at least modelling data, said apparatus comprising:

control means for controlling an operation for making an image and representing said modelling data as polygons having apexes;

an odd field memory controlled by said control means, said odd field memory including one odd bit for storing a vertical direction coordinate of an apex of a polygon in an odd field when said vertical direction coordinate of said apex in said odd field is located between odd-numbered horizontal scanning lines of said odd field and on an even-numbered horizontal scanning line of an adjacent even field;

an even field memory controlled by said control means, said even field memory including one even bit for storing a vertical direction coordinate of an apex of a polygon in an even field when said vertical direction coordinate of said apex in said even field is located between even-numbered horizontal scanning lines of said even field and on an odd-numbered horizontal scanning line of an adjacent odd field;

coordinate converting means controlled by said control means for converting coordinate data including modelling data for said odd field and modelling data for said even field into image data for said odd and even field memories, said modelling data for said odd field including said vertical direction coordinate for said odd field, and said modelling data for said even field including said vertical direction coordinate for said even field;

image synthesizing means controlled by said control means for alternately reading data from said odd field memory of said odd field and from said even field memory of said even field at a field period to synthesize an image to be displayed in an interlace fashion and for producing display data, said synthesizing means processing said one odd bit included in said odd field memory to produce a half-line vertical shift in an apex of said display data for a corresponding odd field so that a vertical position of said apex located between odd-numbered horizontal scanning lines in said image to be displayed is accurately maintained in every odd field, and said synthesizing means processing said one even bit included in said even field memory to produce a half-line vertical shift in an apex of said display data for a corresponding even field so that a vertical position of said apex located between even-numbered horizontal scanning lines in said image to be displayed is accurately maintained in every even field; and output means for outputting said display data from said image synthesizing means as a video signal for display.

3. The apparatus according to claim 2, wherein said modelling data contained in said image data is formed of polygon data.

4. The apparatus according to claim 2, further comprising reproducing means for reproducing said image data from a recording medium in which said image data is recorded.

5. The apparatus according to claim 2, further comprising reproducing means for reproducing audio data and said image data from a recording medium on which said audio data and said image data are recorded.

6. The apparatus according to claim 4, wherein said recording medium comprises a CD-ROM.

7. The apparatus according to claim 4, further comprising a main memory for storing therein said image data reproduced by said reproducing means.

8. The apparatus according to claim 5, further comprising a main memory for storing therein said image data and said audio data reproduced by said reproducing means.

9. The apparatus according to claim 8, further comprising audio synthesizing means for decoding said audio data stored in said main memory.

10. The apparatus according to claim 9, wherein said audio synthesizing means includes a buffer memory.

11. The apparatus according to claim 5, wherein said recording medium comprises a CD-ROM.

12. A method of making an image from image data including three-dimensional modelling data, said method comprising the steps of:

representing three-dimensional modelling data as two-dimensional polygons having apexes;

storing in one odd bit of an odd field memory a vertical direction coordinate of an apex of a polygon corresponding to a present odd field when said vertical direction coordinate of said apex is located between odd-numbered horizontal scanning lines of said present odd field and on an even-numbered horizontal scanning line in an adjacent even field;

storing in one even bit of an even field memory a vertical direction coordinate of an apex of a polygon corresponding to a present even field when said vertical direction coordinate of said apex is located between even-numbered horizontal scanning lines of said present even field and on an odd-numbered horizontal scanning line in an adjacent odd field;

converting said three-dimensional modelling data and said vertical direction coordinates of said odd and even fields into image data for said odd and even field memories;

alternately reading data from said odd and even field memories;

synthesizing an image to be displayed in an interlace fashion from said converted data and producing display data, said synthesizing step including processing said one odd bit of said odd field memory to produce a half-line vertical shift in an apex portion of said display data when an apex of a polygon is located between odd-numbered horizontal scanning lines and on an even-numbered horizontal scanning line in an adjacent even field, and processing said one even bit of said even field memory to produce a half-line vertical shift in an apex portion of said display data when an apex of a polygon is located between even-numbered horizontal scanning lines and on an odd-numbered horizontal scanning line in an adjacent odd field so that a vertical position of apexes of a polygon are accurately maintained in every field; and outputting said display data from said synthesizing step as a video signal for display.

13. A method of making an image from image data including modelling data, said method comprising the steps of:

representing modelling data as polygons having apexes;

storing in one odd bit of an odd field memory a vertical direction coordinate as data representing a position of an apex of a polygon in an odd field when said apex is located between odd-numbered horizontal scanning lines of said odd field and on an even-numbered horizontal scanning line of an adjacent even field;

storing in one even bit of an even field memory a vertical direction coordinate as data representing a position of an apex of a polygon in an even field when said apex is located between even-numbered horizontal scanning lines of said even field and on an odd-numbered horizontal scanning line of an adjacent odd field;

converting said modelling data and said vertical direction coordinates of said odd and even fields into image data for said odd and even field memories, said odd and even field memories respectively corresponding to said odd field and said even field at a field period;

alternately reading data from said odd and even field memories;

synthesizing an image to be displayed in an interlace fashion from said converted data read from said odd and even field memories and producing display data, said synthesizing step including processing said one odd bit corresponding to said odd field to produce a half-line vertical shift in an apex portion of said display data when an apex of a polygon is located between odd-numbered horizontal scanning lines of said odd field and on an even-numbered horizontal scanning line of an adjacent even field, and processing said one even bit corresponding to said even field to produce a half-line vertical shift in an apex portion of said display data when an apex of a polygon is located between even-numbered horizontal scanning lines of said even field and on an odd-numbered horizontal scanning line of an adjacent odd field so that a vertical position of apexes of a polygon are accurately maintained in every field; and outputting said display data from said synthesizing step as a video signal for display.

* * * * *